United States Patent [19]
Cunha

[11] Patent Number: 5,340,274
[45] Date of Patent: Aug. 23, 1994

[54] INTEGRATED STEAM/AIR COOLING SYSTEM FOR GAS TURBINES

[75] Inventor: Francisco J. Cunha, Schenectady, N.Y.

[73] Assignee: General Electric Company, Schenectady, N.Y.

[21] Appl. No.: 854,580

[22] Filed: Mar. 20, 1992

Related U.S. Application Data

[63] Continuation-in-part of Ser. No. 794,032, Nov. 19, 1991.

[51] Int. Cl.⁵ .............................................. F01D 5/18
[52] U.S. Cl. ..................................... 415/115; 415/48; 415/114; 415/179; 416/96 A; 416/97 R; 60/39.05; 60/39.54; 60/39.58
[58] Field of Search ............... 415/114, 115, 116, 177, 415/179, 47, 48; 416/96 R, 96 A, 97 R; 60/39.53, 39.54, 39.58, 39.59, 39.05

[56] References Cited

U.S. PATENT DOCUMENTS

| | | | |
|---|---|---|---|
| 2,647,368 | 8/1953 | Triebbnigg et al. | 60/39.54 |
| 3,729,930 | 5/1973 | Williams | 60/39.58 |
| 3,808,833 | 5/1974 | Allen et al. | |
| 4,314,442 | 2/1982 | Rice | |
| 4,338,780 | 7/1982 | Sakamoto et al. | 60/39.53 |
| 4,369,016 | 1/1983 | Dennison | |
| 4,424,668 | 1/1984 | Mukherjee | |
| 4,565,490 | 1/1986 | Rice | |
| 4,807,433 | 2/1989 | Maclin et al. | 415/115 |
| 5,120,192 | 6/1992 | Ohtomo et al. | 416/96 A |
| 5,160,096 | 11/1992 | Perkins et al. | 415/114 |

FOREIGN PATENT DOCUMENTS

| | | | |
|---|---|---|---|
| 0062932 | 10/1982 | European Pat. Off. | |
| 0392664 | 10/1990 | European Pat. Off. | |
| 0126034 | 7/1985 | Japan | 416/97 R |
| 0206905 | 10/1985 | Japan | 415/114 |
| WO80/00864 | 5/1980 | PCT Int'l Appl. | |
| 0861632 | 2/1961 | United Kingdom | 60/39.54 |
| 1555587 | 11/1979 | United Kingdom | |
| 2228295 | 8/1990 | United Kingdom | |
| 2236145 | 3/1991 | United Kingdom | 416/97 R |

OTHER PUBLICATIONS

"Future Gas Turbine Development Options Definition Study" Electric Power Research Institute, Jun. 1987.
"Development, Installation... Generator", Burnham et al., pp. 1-8, ASME, International Gas Turbine Conference, Dusseldorf, Germany, Jun. 1986.

Primary Examiner—Edward K. Look
Assistant Examiner—Christopher Verdier
Attorney, Agent, or Firm—Nixon & Vanderhye

[57] ABSTRACT

A steam or air cooled combined cycle gas turbine includes first and second turbine stages and a second nozzle stage. During start-up, cooling air is supplied radially inwardly through the second stage nozzle for flow into the gas flow through the turbine and for combining with cooling air flowing radially outwardly from a high pressure compressor port. The combined air flow flows radially outwardly through the turbine blades. In normal operation, steam in lieu of air flows radially inwardly through the second nozzle stage and radially outwardly between the turbine wheels and spacer therebetween. Part of the steam through the nozzle stage combines with the radially outwardly flowing steam for cooling the turbine blades. The balance of the steam flows into the gas flow through the turbine. Combined steam/air cooling is effected for abnormally high turbine blade temperatures by combining cooling air from the high pressure discharge port of the compressor with the steam flowing radially outwardly through the turbine blades.

19 Claims, 7 Drawing Sheets

5,340,274

INTEGRATED STEAM/AIR COOLING SYSTEM FOR GAS TURBINES

RELATED APPLICATIONS

This application is a continuation-in-part of application Ser. No. 07/794,032, filed Nov. 19, 1991, the disclosure of which is incorporated in this application by reference.

BACKGROUND AND SUMMARY OF THE INVENTION

The present invention relates to a cooling system for a gas turbine and particularly relates to an integrated steam/air cooling system for a combined cycle turbine and a method of operating the system.

The traditional approach for cooling gas turbine blades and nozzles is to extract air from a source at a sufficiently high pressure, e.g., by extracting air from the intermediate and last stages of the gas turbine compressor. A series of internal flow passages are typically used to achieve the desired mass flow objectives for cooling the turbine blades; whereas, for nozzles, cooling air is supplied and controlled through external piping. The cooling air flow circuits bypass the combustors where heat is supplied to the thermodynamic cycle. Thus, the diverted coolant air does not receive energy directly from the combustors and does not completely expand through the turbine. This arrangement represents parasitic losses to the turbine output and degrades overall performance efficiency.

Steam cooling in reheat gas turbines has been previously discussed, e.g., see U.S. Pat. Nos. 4,314,442 and 4,565,490 to Rice. Steam cooling has also been discussed in a report by the Electric Power Research Institute, Report No. RP2620-1, entitled "Future Gas Turbine Development Options Definition Study," dated June 1987. This report describes the anticipated performance improvement for steam cooling from a thermodynamic cycle analysis perspective. In the context of that report, the steam cooling supply requirements included a very high pressure source, i.e., on the order of 1840 psia, because it was then believed that such high pressure was needed to overcome circuit friction losses, as well as adverse rotational and centrifugal field forces associated with that proposed closed cooling circuit configuration.

In a combined cycle operation, steam at several pressure and temperature levels is readily available. Coolant air in a gas turbine can be replaced by steam, which is the better cooling medium. Moreover, the problem of degradation of thermal efficiency associated with air as the cooling medium is ameliorated as the transition from air to steam cooling is performed. By using steam as coolant, it is also possible to increase the firing temperatures in the gas turbine cycle.

As set forth in my prior application, identified above, steam and air cooling are integrated in a combined cycle system where primary cooling is provided by steam and off-design operating conditions, e.g., start-up, is provided by air. That is, the gas turbine is operated under normal conditions using steam cooling and has available a backup for operational off-design cooling using air, for example, during start-up or an abrupt failure in the supply of steam. In accordance with that invention, an existing air-cooled gas turbine is modified to change over from operational air cooling to steam cooling. Thus, cooling flow distributions, particularly in the first and second-stage turbine blades and second-stage nozzles, require necessary modification to accommodate steam cooling.

More particularly, second-stage nozzle vanes and first-stage turbine blades are designed specifically to take advantage of the thermal efficiencies of steam cooling. In the second-stage nozzle, a pair of pipes or tubes extend from a manifold coupled to a suitable source of steam from the combined cycle operations and extend through the nozzle vanes and the diaphragm associated with the nozzle vanes. The inner surface of the diaphragm seals with the outer surface of a spacer in a conventional manner, the spacer being carried for rotation with and between the wheels mounting the first and second-stage turbine blades. The spacer defines a pair of chambers with the first and second-stage turbine wheels. Coolant steam passing through the nozzle vanes and through the diaphragm communicates with the chambers and with inlet ports for passage through the first and second-stage turbine blades, as described hereinafter.

Further, discrete inserts envelop and encompass each of the tubes through the nozzle vanes. Each insert is provided with a plurality of apertures for flowing air supplied to the space between the steam carrying tube and the insert outwardly into a cavity defined between the insert and the walls of the nozzle vane. The air cools the nozzle vane and exits the vane both through a series of apertures in its trailing edge and into a chamber within the diaphragm for exit in opposite axial directions into the gas flow through the turbine. The tubes conducting the steam have ribs about their external surfaces to improve the heat transfer relation between the steam within the tubes and the air flowing within the inserts. The external surfaces of the inserts are provided with ribbing, preferably spiral or helical, to direct the flow to the trailing edges and the diaphragm. In operation, the heat transfer between the steam and air lowers the temperature of the steam and increases the temperature of the air. The air flow, however, is expanded and cooled upon passing through the apertures in the insert for cooling impingement against the inside surfaces of the nozzle vanes.

The steam flows through the tubes and diaphragm and through the seal between the diaphragm and the spacer. Preferably, the seal is a labyrinth-type seal with multiple projecting teeth. In accordance with that invention, injector nozzles are spaced one from the other circumferentially about the sealing surface of the spacer. The steam flows from the diaphragm between the adjacent teeth of the labyrinth seal for flow through the injector nozzles in the spacer. The nozzles are shaped to accelerate the flow of steam into the chambers on opposite sides of the spacer.

Coolant steam for the first and second turbine stages is additionally inlet from a location adjacent the shaft of the turbine into the areas between the first and second-stage turbine wheels. Passages are provided through the spacer to enable the steam to enter the chambers. Thus, this inner steam flow passes radially outwardly by centrifugal force to mix with the steam input to the chambers from the tubes of the nozzle stage and the injector nozzles of the spacer. This combined steam flows through and cools the turbine blades of the first and second stages.

In a further aspect of the invention disclosed in my prior application, each first-stage turbine blade includes a serpentine cooling arrangement including four coolant circuits: two single-pass radially outwardly directed passages adjacent the leading and trailing edges of the blade and two intermediate three-pass, forward and aft circuits. The inlet ports for the serpentine passages are through the pedestals mounting the turbine blades. With respect to the forward and aft intermediate circuits, the respective inlet ports are located in the root portion of the blade and the flow of steam is through passages first directed radially outwardly toward the tip portion, then radially inwardly toward the root portion and finally radially outwardly toward the tip portion to exit the turbine blade substantially medially of the blade at its tip portion. The steam therefore flows in serpentine fashion from adjacent the leading and trailing edges in opposite axial directions toward a mid-portion of the turbine blade. Thus, the steam which has collected the most heat from the blade advantageously exits the blade at a location which has the lowest metal temperature.

The leading edge circuit flows steam radially outwardly between an inlet port at the root portion of the blade and an outlet at the tip portion and through a plurality of radially spaced apertures opening into a recess on the leading edge of the blade. That recess is located along the stagnation or pitch area of the blade which is the area of highest blade temperature during operation. The recess contains a porous material, such as woven wire mesh of high density, whereby steam from the first leading edge circuit flows through the apertures into the recess through the mesh for transpiration cooling. The trailing edge circuit flows steam from an inlet port adjacent the root portion of the blade to an outlet adjacent the tip portion, as well as through a series of apertures radially spaced along the trailing edge of the blade.

Additionally, on the pressure side of each vane, there is provided a series of bleed film cooling holes radially spaced along the blade and in communication preferably with the first passageway of the forward intermediate circuit for supplying film cooling steam along the pressure surface of the vane. Film cooling is provided because steam has superior radiant properties, e.g., absorbtivity and emissivity, and absorbs much of the radiant energy and emits this energy at a lower intensity. On the pressure side of the vane, there is also provided a series of bleed film cooling holes radially spaced along the blade, preferably in communication with the final passageway of the aft intermediate circuit. The location of these bleed film cooling holes between the leading and trailing edges of the blade on the suction side is selected because the boundary layer thickens along this area. The boundary layer increases the convective thermal load on the part. By reducing the boundary layer by thin film cooling, the convective thermal load on the part is reduced.

The second-stage turbine blades are each provided with a plurality of straight-through radial passages for passing cooling steam radially outwardly to the blade tips. Each turbine stage has a steam collection shroud adjacent the tips of the blades for collecting the cooling steam.

An air cooling system is integrated with the steam cooling system just described. To accomplish this, a rotating nozzle collar is provided on the inner circumference of the first-stage wheel. Fixed and movable valve structures are mounted about the shaft. The valve is normally closed to prevent air under pressure from the compressor from flowing radially outwardly into the spaces between the wheels and spacer and into the chambers. During start-up or off-design operation, for example, when steam pressure is not available or lost, the solenoid is actuated to open the valve to provide air under pressure into those areas for flow through the inlet ports of the first and second-stage turbine blades to effect cooling. After start-up or when the air cooling is generally not needed, the solenoid closes the valve to prevent air from entering those spaces.

The present invention provides apparatus and methods for integrating steam cooling with existing air cooling designs for gas turbines whereby transitions can be made between air cooling, steam cooling, combinations of air/steam cooling and for all operating conditions of the gas turbine in a manner to obtain full thermodynamic advantage and cycle efficiency. Thus, thermodynamic losses are eliminated or minimized, while, concurrently, steam cooling permits higher firing temperatures for higher machine output ratings. Additionally, combustor emission controls are improved by affording more air and steam in the combustion process without effect on other operational components of the turbine. For example, and still further, thermal low-cycle fatigue of turbine rotor wheels occurs as a result of temperature gradients induced across the wheels caused by cooling air flow around the turbine wheels. By replacing the cooling air with steam, thermal gradients are reduced and life expectancy of the turbine rotor wheels is extended.

The present invention provides a system for integrating the steam cooling features of the first and second stage turbine blades and second stage nozzles set forth in my prior application, with existing air cooling circuits in current gas turbine designs. Moreover, the system integrates air and steam cooling for all modes of operation of the turbine, for example, affording a smooth transition from air cooling to steam cooling during start-up when steam becomes available, steam cooling during normal operations with the option of affording additional air cooling, and with additional cooling afforded by air cooling during periods of abnormal operation, e.g., when particularly hot parts of the turbine blades are detected. Consequently, the present invention affords an integrated steam/air cooling system for gas turbines having better cycle efficiency, higher firing temperatures, enhanced turbine cooling, flexibility in combustion emission control and enhancement of turbine rotor wheel low-cycle fatigue life.

In a preferred embodiment according to the present invention, there is provided an integrated steam/air cooling system for a gas turbine comprising a pair of axially spaced, rotatable turbine stages, each having a plurality of turbine blades for disposition in a gas flow through the turbine, at least certain of the turbine blades each having at least one interior passage, a nozzle stage between the turbine stages and including a plurality of nozzle vanes for disposition in the gas flow through the turbine, at least certain of the vanes each having at least one interior passage. Means are provided for supplying cooling air to the interior passages to air cool the turbine and for supplying steam to the interior passages to steam cool the turbine. Means are cooperable with the cooling air supply means and the steam supply means for effecting a transition between air cooling the turbine and steam cooling the turbine.

In a further preferred embodiment according to the present invention, in a gas turbine having a pair of axially spaced, rotatable turbine stages, each having a plurality of turbine blades for disposition in a gas flow through the turbine with at least certain of the turbine blades each having at least one interior passage, a nozzle stage between the turbine stages and including a plurality of nozzle vanes for disposition in the gas flow through the turbine with at least certain of the vanes each having at least one interior passage, a method of operating a cooling system for the gas turbine including the steps of initially supplying cooling air to the interior passages of said turbine blades to air cool the turbine during start-up of the turbine, thereafter supplying steam to the interior passages of said turbine blades to steam cool the turbine during normal operation of the turbine after turbine start-up and means cooperable with the cooling air supply means and the steam supply means for effecting a transition between air cooling the turbine and steam cooling the turbine.

Accordingly, it is a primary object of the present invention to provide a novel and improved steam/air cooling system for gas turbines.

These and further objects and advantages of the present invention will become more apparent upon reference to the following specification, appended claims and drawings.

BRIEF DESCRIPTION OF THE DRAWING FIGURES

DETAILED DESCRIPTION OF THE DRAWING FIGURES

Reference will now be made in detail to a present preferred embodiment of the invention, an example of which is illustrated in the accompanying drawings.

For clarity, the following description will proceed first with respect to the nozzle and turbine stages of the gas turbine, principally as set forth in my prior application, followed by a description of the present integrated steam/air cooling system and its operation.

Figure 1:
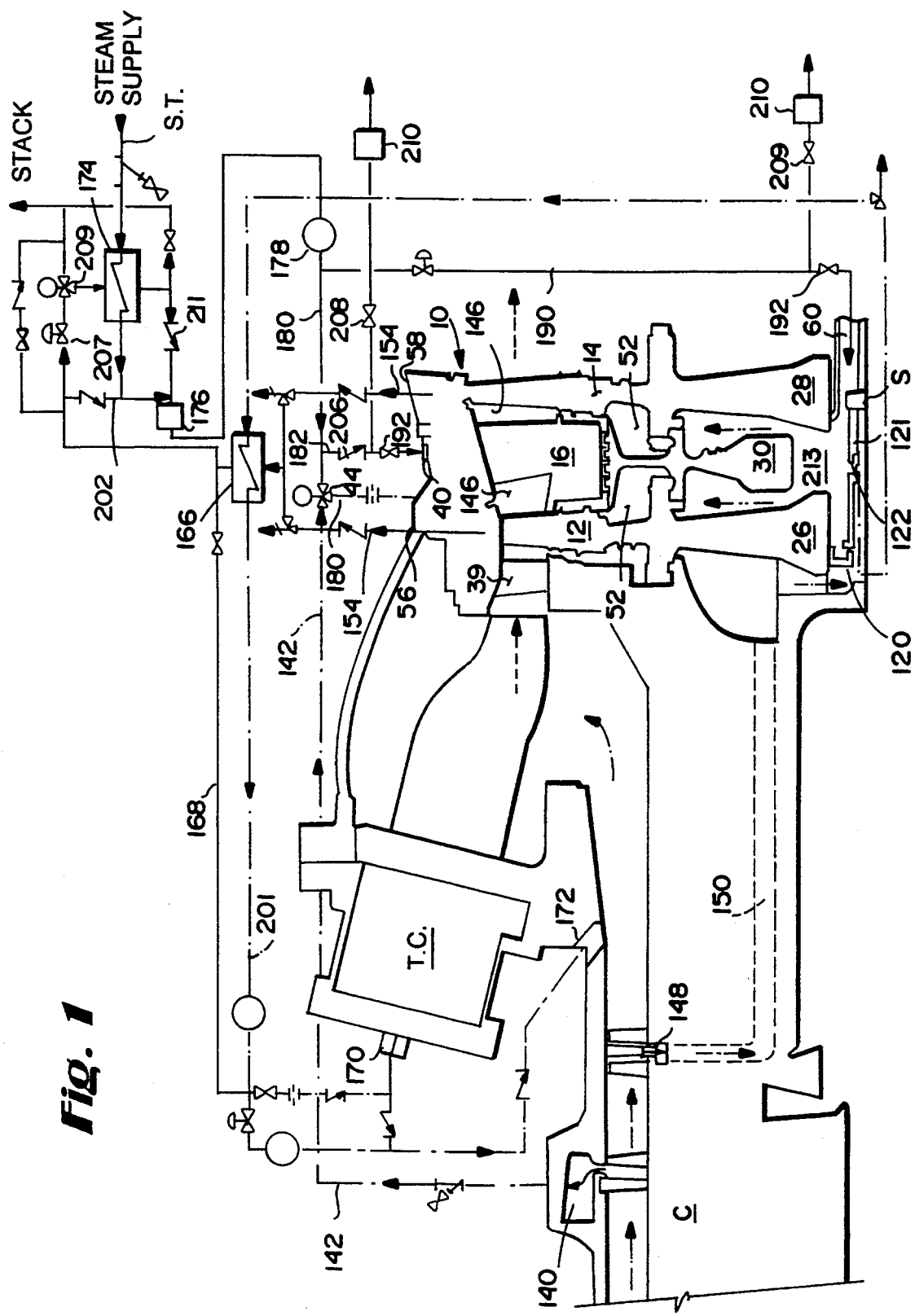
FIG. 1 is a fragmentary longitudinal cross-sectional view through the shaft of a turbine and schematically illustrating the system components for the steam/air cooling system hereof for the turbine stages.
Figure 2:
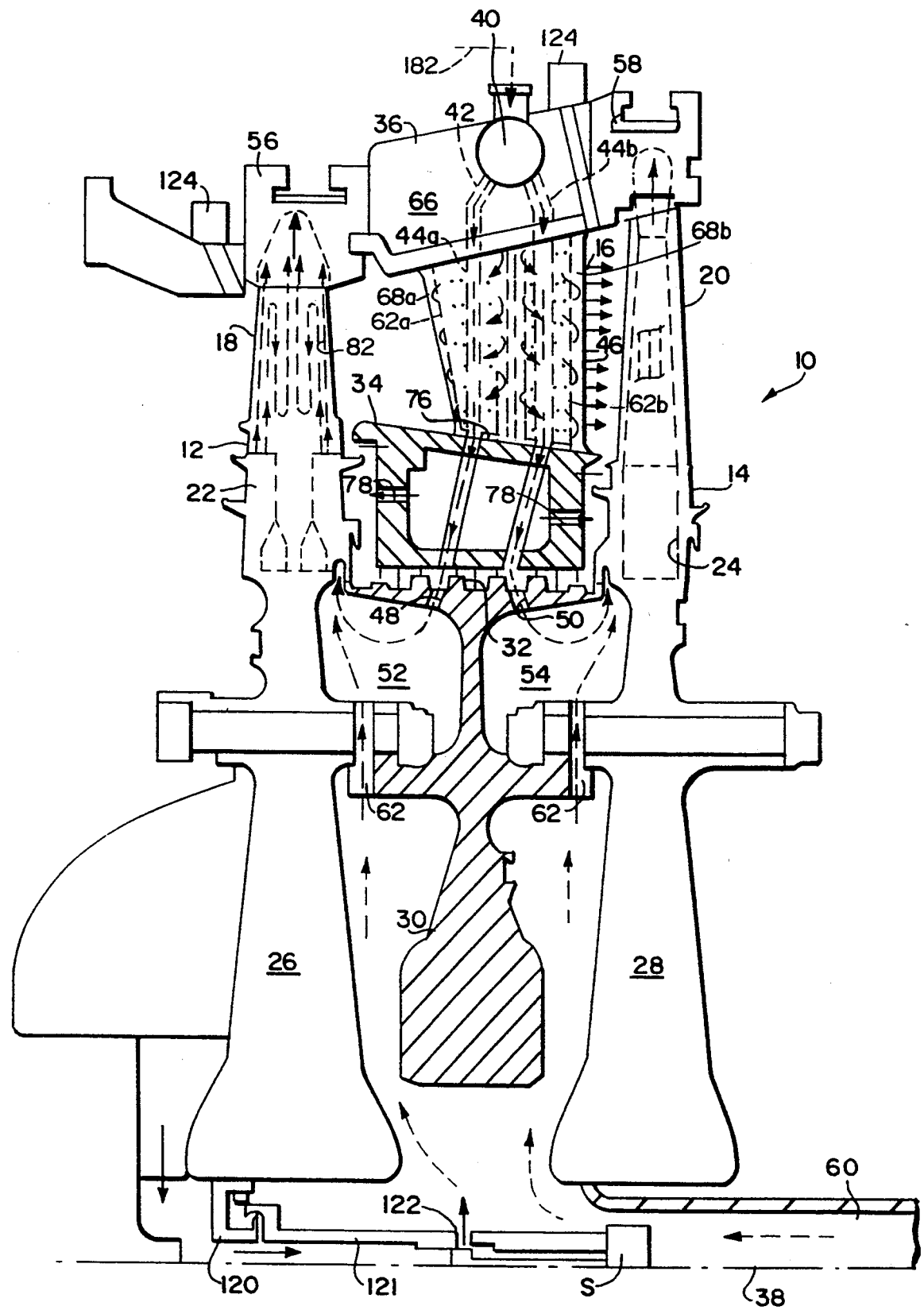
FIG. 2 is an enlarged fragmentary longitudinal cross-sectional view through the shaft of the turbine illustrating the first and second turbine stages and a second nozzle stage.

Referring to FIGS. 1 and 2, there is illustrated a section of a combined cycle gas turbine, generally designated 10, including first and second turbine stages 12 and 14, respectively, and a second nozzle stage 16. Each of the first and second turbine stages, as illustrated in FIG. 2, includes a plurality of turbine blades 18 and 20, respectively, mounted on pedestals 22 and 24, in turn, mounted on turbine wheels 26 and 28. A spacer 30 is disposed axially between and secured to wheels 26 and 28 for rotation therewith and includes a sealing surface 32 for sealing against the inner face of a fixed diaphragm 34 forming part of the second nozzle stage 16. The inner face of the diaphragm 34 preferably forms a labyrinth seal with the outer surface 32 of spacer 30. The second nozzle stage 16 includes a plurality of fixed radially extending vanes 46 circumferentially spaced one from the other and extending radially outwardly from diaphragm 34 to a turbine support frame 36. The turbine shaft is schematically represented by the dashed line 38. It will be appreciated that gas from turbine combustors T.C. (FIG. 1), flows generally axially, for example, from left to right in FIG. 2, through first-stage nozzles 39 for driving the first turbine stage, which gas then flows through the fixed second-stage nozzles for driving the second turbine stage.

To integrate steam and air cooling circuits in a single gas turbine, steam is passed from a steam supply ST (FIG. 1) of the combined cycle turbine through a manifold 40 having a pair of branches 42 coupled with tubes 44a and 44b which extend radially inwardly along the interior of each nozzle vane 46. Tubes 44a and 44b pass through diaphragm 34 and exit along the inner face of the diaphragm at the adjoining seal faces of the diaphragm 34 and spacer 30. The flow of steam then passes through injector nozzles 48 and 50 of spacer 30 inwardly of the spacer seal face 32 into interior chambers 52 and 54 on axially opposite sides of spacer 30. The steam in chambers 52 and 54 communicates with inlet ports in the pedestals adjacent the root portions of turbine blades 18 and 20 for supplying cooling steam to the turbine blades. The steam exits the tip portions of the blades 18 and 20 into shrouds 56 and 58, respectively.

Steam is also inlet to chambers 52 and 54 from a location adjacent shaft 38. For example, steam is inlet through an axially extending channel 60 for flow into the spaces between spacer 30 and wheels 26 and 28 and through passages 62 into chambers 52 and 54. This combined steam flow then passes through the turbine blades to cool the blades. The mixing of the two steam flows in chambers 52 and 54 minimizes or eliminates undesirable vortex circulation cells in the cavities which might otherwise occur.

Figure 3:
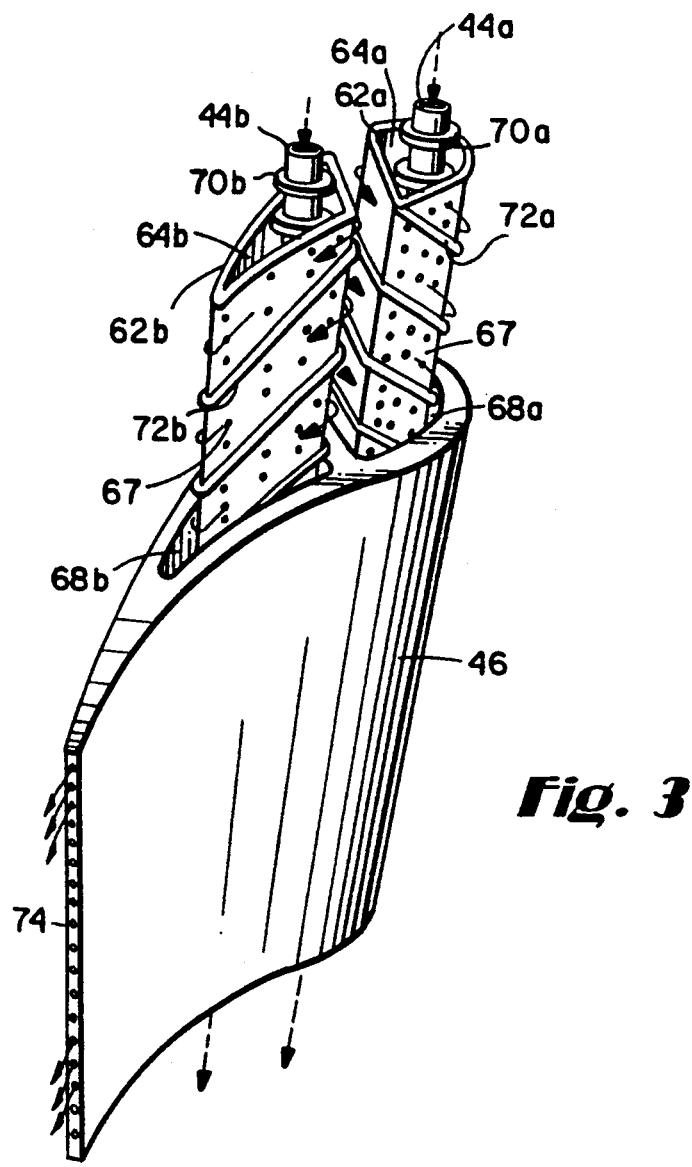
FIG. 3 is a perspective view with parts broken out to illustrate the cooling passages within a nozzle vane of the second-stage nozzle.
Figure 4:
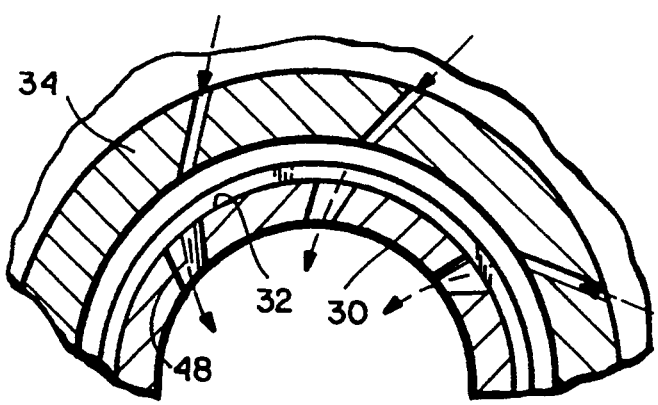
FIG. 4 is a fragmentary enlarged cross-sectional view illustrating a seal between the diaphragm of the second-stage nozzle and the sealing face of a spacer and further illustrating the flow of steam from the fixed diaphragm through the spacer into the chambers.

As disclosed in my prior application and as illustrated in FIG. 3 hereof, each tube 44a and 44b within vane 46 is enclosed within an insert 62a and 62b which extends coextensively with tubes 44a and 44b, respectively, the full length of vanes 46. Each insert 62a and 62b surrounds a respective tube 44a and 44b to define an air passageway between it and the surrounding tube. Air is inlet to passageways 2a and 62b via air chambers 66 formed in the frame of the turbine. Each insert 62a and 62b is provided with a plurality of very small apertures 67 whereby air, under pressure, within passages 64a and 64b can expand through the apertures into the respective cavities 68a and 68b defined between the inserts and the interior walls of the vanes 46. Tubes 44a and 44b carry fins 70a and 70b about their outer surfaces, which cause the cooling air flow in passages 64a and 64b, respectively, to be turbulent. The turbulent air flows about the fins enhance the capacity to carry additional convection energy from the walls of tubes 44a and 44b. Secondly, the fins enhance the conductive heat transfer from the tube walls to the air. Thus, steam flowing through tubes 44a and 44b is reduced in temperature, while the air carries the heat energy to the insert walls. The coolant air in passages 64a and 64b expands through the impingement apertures 67 into cavities 68a and 68b to provide a plurality of cooling air jets to impinge against the interior walls of vanes 46.

Flow divider tubes 72a and 72b are provided on inserts 62a and 62b, respectively. Preferably, the divider tubes are spiral or helical to direct the air flow in a radially inwardly helical flow direction, thus enhancing the heat transfer relation with the interior walls of nozzle vanes 46. As illustrated, a plurality of radially spaced apertures 74 are provided along the trailing edge of each vane 46 in communication with cavity 68b to vent the cooling air into the gas stream. The cavities 68a and 68b also communicate through vent spacing 76 with the interior of diaphragm 34. The interior of diaphragm 34, in turn, lies in communication with the gas flow through the turbine through axially opening apertures 78.

Figure 5:
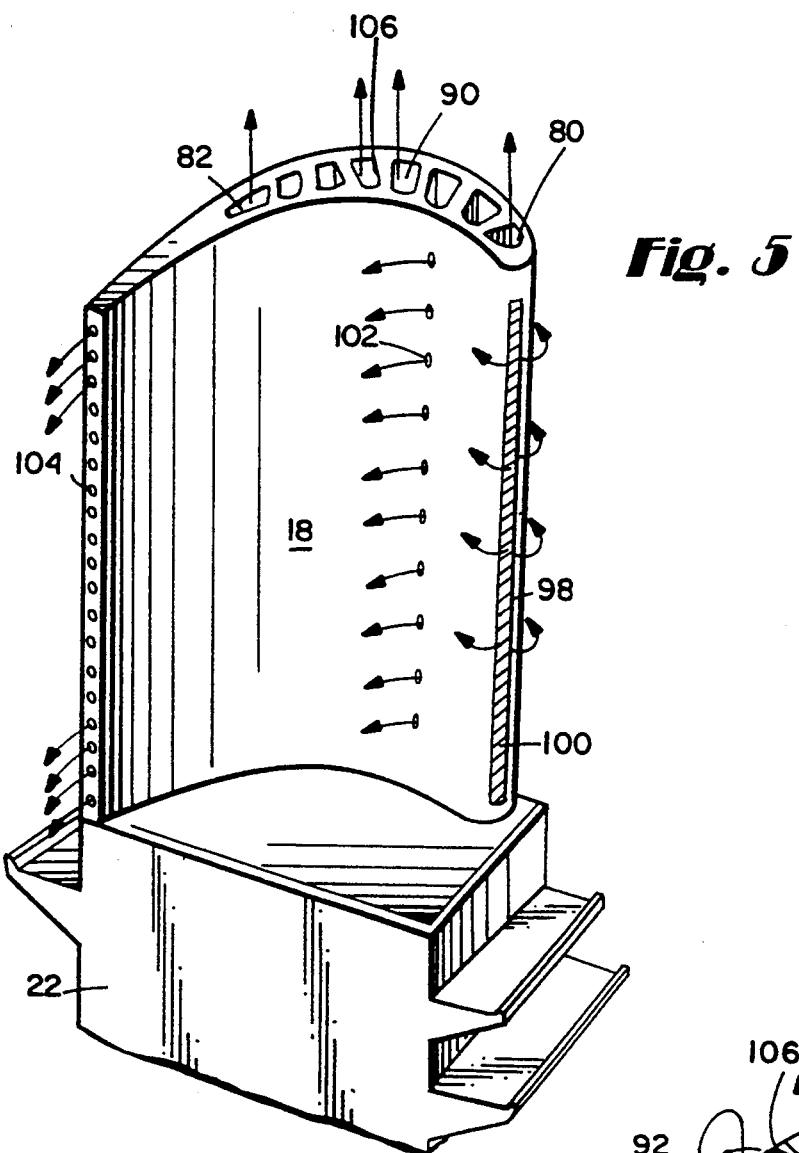
FIG. 5 is a perspective view of a turbine blade constructed in accordance with the present invention.
Figure 6:
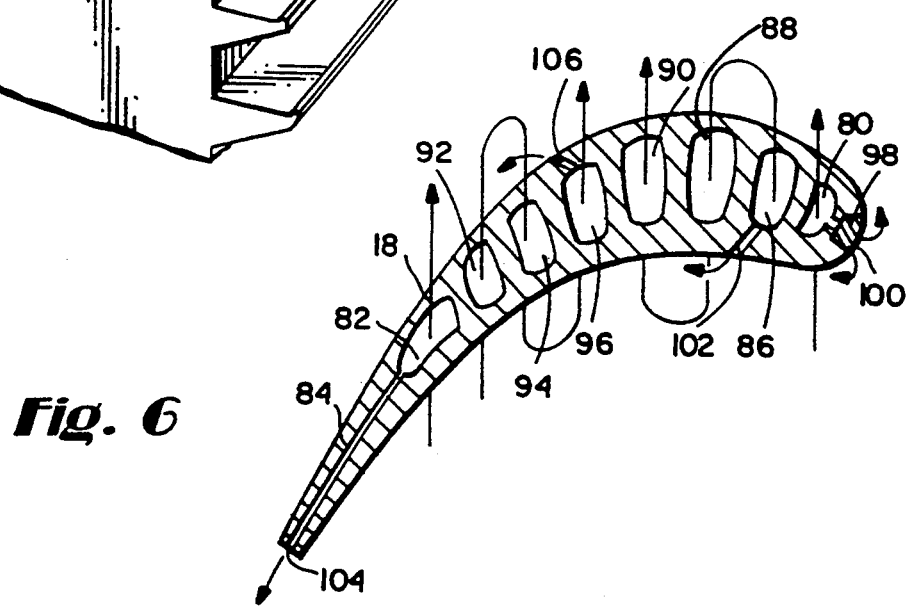
FIG. 6 is a cross-sectional view of the blade illustrating the various steam flow cooling paths.

The first-stage turbine blade 18 is mounted on its pedestal 22. Each turbine blade 18 has a serpentine cooling arrangement comprising preferably four discrete cooling circuits extending from adjacent the root portion of the blade to its tip portion. The leading edge circuit comprises a radially straight single-pass passageway 80 in communication adjacent its root portion with an inlet port for receiving steam from chamber 52. Passageway 80 has an outlet port adjacent its tip portion for flowing steam from the blade into shroud 56. A single-pass trailing edge circuit is provided and comprises a passageway 82 in communication with an inlet port adjacent its root portion for receiving steam from chamber 52. Passageway 82 extends radially outwardly through the blade exiting through an outlet port at its tip portion for flowing steam into shroud 56. The trailing edge passageway 82 also communicates with a plurality of radially spaced passages 84 which open through apertures 104 at the trailing edge of blade 18. The two intermediate circuits comprise three-pass forward and aft circuits, respectively. The forward circuit includes a passageway 86 in communication with an inlet port adjacent the root portion of the blade for receiving steam from chamber 52. The steam flows from the root portion along passageway 86 toward the tip portion, back radially inwardly through a second passageway 88 and again toward the tip portion through passageway 90. The trailing three-pass circuit similarly includes a passageway 92 having an inlet port adjacent the root portion in communication with chamber 52 for passing steam radially outwardly through passageway 92 toward the tip portion, back toward the root portion via passageway 94 and then again toward the tip portion via passageway 96 for exit into fixed shroud 56. The multiple-pass forward and aft intermediate circuits are arranged so that the final pass in each circuit lies substantially in the middle or mid-way of the airfoil shape of the blade, as illustrated in FIG. 5, i.e., through passageways 90 and 96. The passageways are arranged in this manner such that the final passageways 60 lie in the area of the airfoil having the lowest metal temperature.

It is significant that steam cooling is provided adjacent the stagnation point or area of the airfoil. The stagnation or pitch area of the airfoil, is an area substantially along the mid-portion of the leading edge of the airfoil. It is important to cool the stagnation area because the temperature can approach the blade's melting temperature. To eliminate this severe thermal condition, a recess 98 is formed, for example, during casting, in the leading edge of the blade. Recess 98 contains a porous material 100, for example, a woven wire mesh of high density. Recess 98 lies in direct communication with the single-pass leading edge passageway 80 for supplying steam in the recess and through the mesh material for outflow along the opposite sides of the airfoil blade. Thus, transpiration cooling is applied to the leading edge.

Film cooling along both suction and pressure sides of the blade is provided. Particularly, there is provided on the pressure side of the airfoil, cooling passages 102 spaced along the length of the blade and in communication with the first passageway 86 of the forward intermediate circuit. The first passageway 86 is used as the cooling supply for the thin film coolant along the pressure side because the radiant heat flux is most severe along the forward portion of the pressure side of the airfoil. On the suction side, a series of passages 106 lie in communication with the final passageway 96 of the trailing cooling circuit to establish film cooling along the suction side. Passages 106 are located along the airfoil substantially where the boundary layer thickens, which increases the convective thermal load on that part. Thus, the thin film cooling enhances the heat transfer relation along that portion of the airfoil previously inhibited from substantial heat transfer by the boundary layer.

Referring to FIG. 1, there is illustrated a system for air cooling the turbine during start-up or shut-down or off-design conditions when steam is not available. The air cooling system includes a passageway in communication via ducting 150 with the turbine compressor, for flowing air adjacent the shaft and past a rotating nozzle collar 120. There is also provided a non-rotatable annular valve part 121 movable by a solenoid S to define a normally closed air gap 122. Actuation of solenoid S may be provided by a set of pyrometers 124 (FIG. 2) installed adjacent the tips of the first and second-stage turbine blades for sensing the temperature of the metal of the blades. The pyrometers are of known construction and emit electrical signals which may be forwarded to analog processing units for amplification and control of solenoid S. Consequently, when a blade temperature above a predetermined temperature obtains, the pyrometers sense such temperature and actuate solenoid S to open air gap 122, enabling air to flow along the shaft and radially outwardly through gap 122 into the space between the wheels and the spacer. The air may then flow radially outwardly into chambers 52 and 54 for flow into the serpentine passages of the first-stage turbine blades and into the radially straight passages of the second-stage turbine blades as previously described.

Referring now to FIG. 1, the turbine air and steam cooling supply and control systems are disclosed. The air cooling system includes an intermediate pressure extraction port 140 of compressor C in communication via conduit 142 with a three-way control valve 44 for supplying cooling air into chambers 66 about tubes 44 for egress into diaphragm 34 and into the gas flow passing in the wheel spaces 146. Cooling air is also provided from a high pressure extraction port 148 of the compressor C for flow via a conduit 150 adjacent the rotor 38. When solenoid S is actuated to open air gap 122, cooling air flows through the chambers on opposite sides of the spacer 30, through passages 62 of the spacer, into chambers 52 and 54 and into the passages of the first and second stage turbine blades. Shrouds 152 collect the air and direct it via conduits 154 into a heat exchanger 166 for return via conduit 168 to either the steam injector 170 or the compressor discharge port 172. Suitable control valves are provided in these conduits for selection of the return path in accordance with combustor emission requirements for a particular installation.

With respect to the steam supply circuit, steam is supplied from steam supply ST via a heat exchanger 174 for supplying the cooling tubes 44a and 44b of the second stage nozzle with cooling steam via a metering device 176, a flow meter 178, conduits 180 and 182 and a manifold 184 (FIG. 2) in communication with tubes 44a and 44b. Steam passes through the tubes, cooling the second stage nozzle vanes and into the chambers 52 and 54 for flow radially outwardly under centrifugal forces through the passages in the first and second stage turbine blades. The steam exits the passages of the turbine blades via conduits 154 for flow into heat exchanger 166. Steam is also supplied from a conduit 190 which, when valve 192 is open, supplies steam through channel 60 into the spaces on opposite sides of the spacer 30 and into chambers 52 and 54 for combination with the steam entering those chambers from the second stage nozzle vanes. The mixing of the steam from the two steam paths promotes steam flow into the first and second stage blades without undesirable vortex circulation cells in the cavities. The shrouds 56 and 58 adjacent the tips of the turbine blades collect the steam for flow through heat exchanger 166 via conduits 154.

Figure 7:
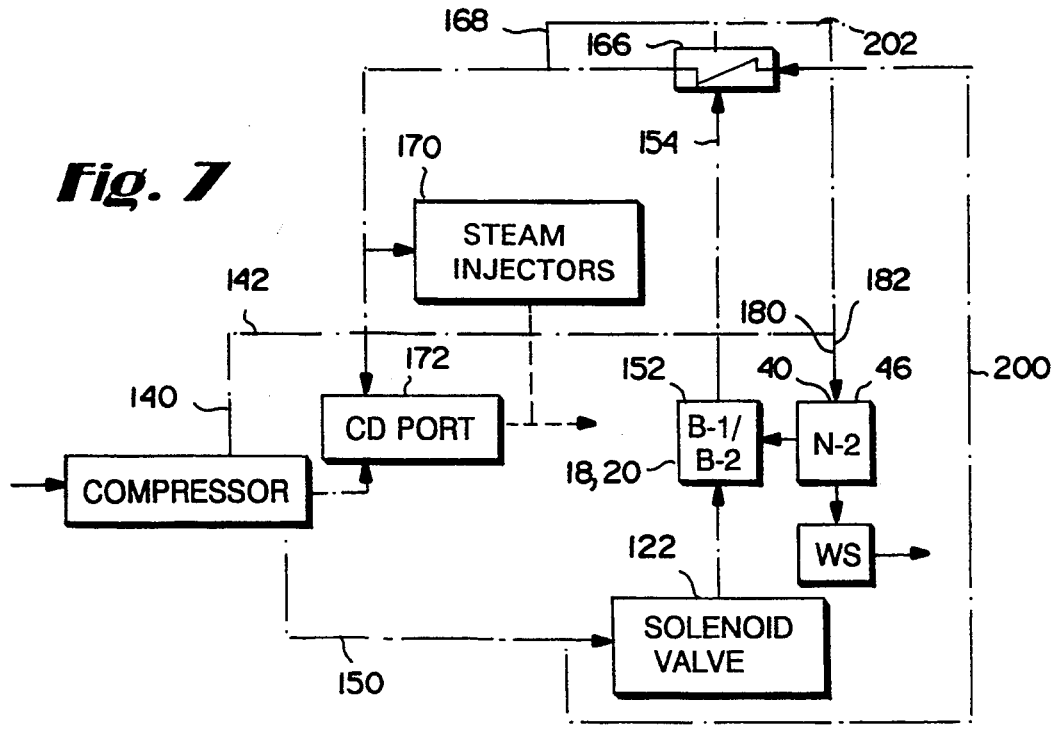
FIGS. 7–10 are schematic block diagrams of various operational stages of the cooling system of the turbine and illustrating control systems therefor.

The operation of the cooling system will now be described with respect particularly to drawing FIGS. 1 and 7–10 wherein steam cooling lines are represented by solid lines, air cooling lines by dot/dash lines, and turbine gas flow by the dashed lines. During turbine start-up, steam is not available to the gas turbine cycle. Thus, the air cooling circuit is activated to cool the turbine blades. With reference to FIGS. 1, 2 and 7, cooling air from the intermediate pressure extraction port 140 flows through conduits 142 and 180 and flows into the second stage nozzle vanes 46 to cool the nozzle walls through the heat transfer mechanism described previously. The cooling air exits the diaphragm into the wheel spaces 146 and combines with the gas flow through the turbine. To cool the turbine blades, the solenoid S is actuated to open air gap 122. Extraction air from the high pressure compression source 148 is supplied via conduit 150 past open valve 122 into the areas on opposite sides of the spacer 30 and into the chambers 52 and 54 via passages 62 for flow through the various passages of the turbine blades to cool the blades 18 and 20. The shrouds 56 and 58 collect the air for passage via conduits 154 to the heat exchanger 166 and return via conduit 168 to either the combustion governor 170 i.e., combustor steam injection 170, or the compression discharge port 172. A high pressure bypass extraction conduit 200 supplies air to the tubes of heat exchanger 166 for cooling the air from the turbine blades and heating the bypass flow. The heat exchanger thus acts as a regenerator and the bypass flow returns to the gas cycle at either the compressor discharge port or the combustor steam injection 170. Because the return for the bypass flow is close to the air extraction point, this bypass circuit forms a first closed air circuit. The cooled air from the shell of heat exchanger 166 may pass via conduit 202 and 180 into the manifold 40 via conduit 182 for cooling the second stage nozzle vanes, as previously described. This forms the second closed air circuit during start-up operation.

Figure 8:
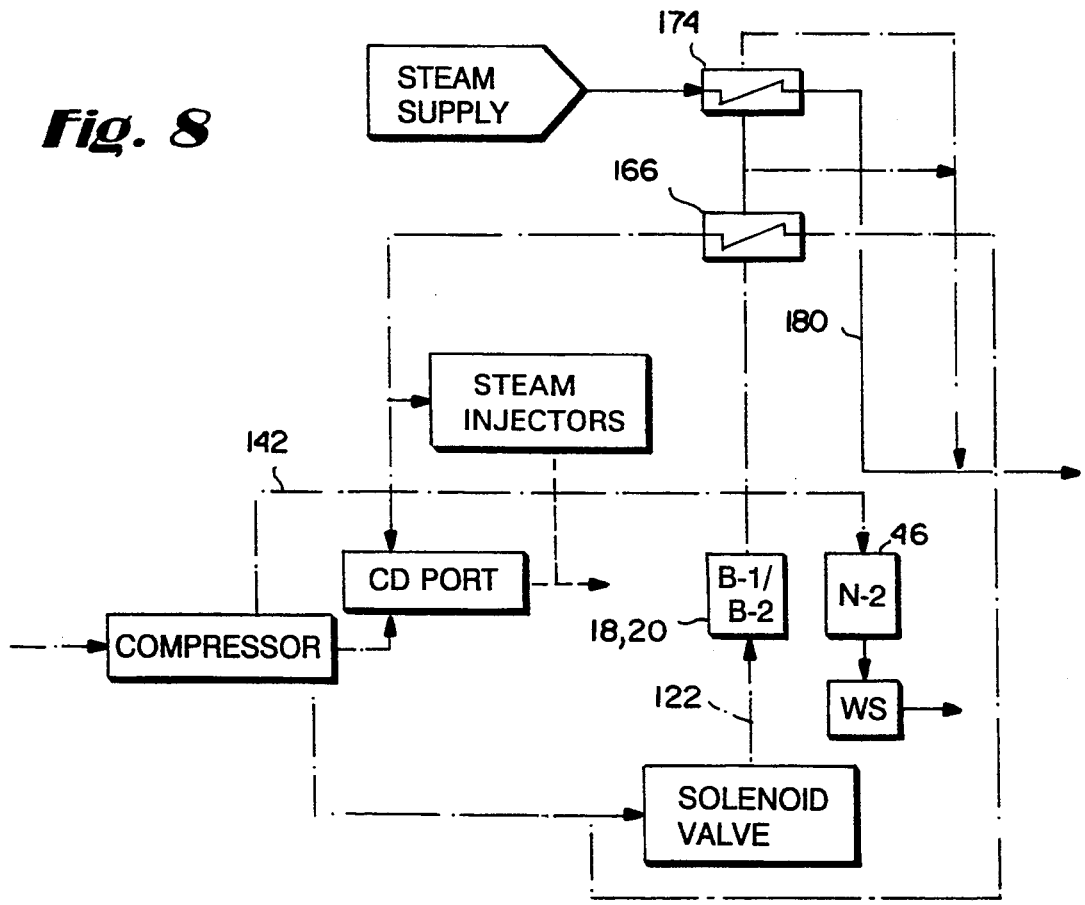
Figure 9:
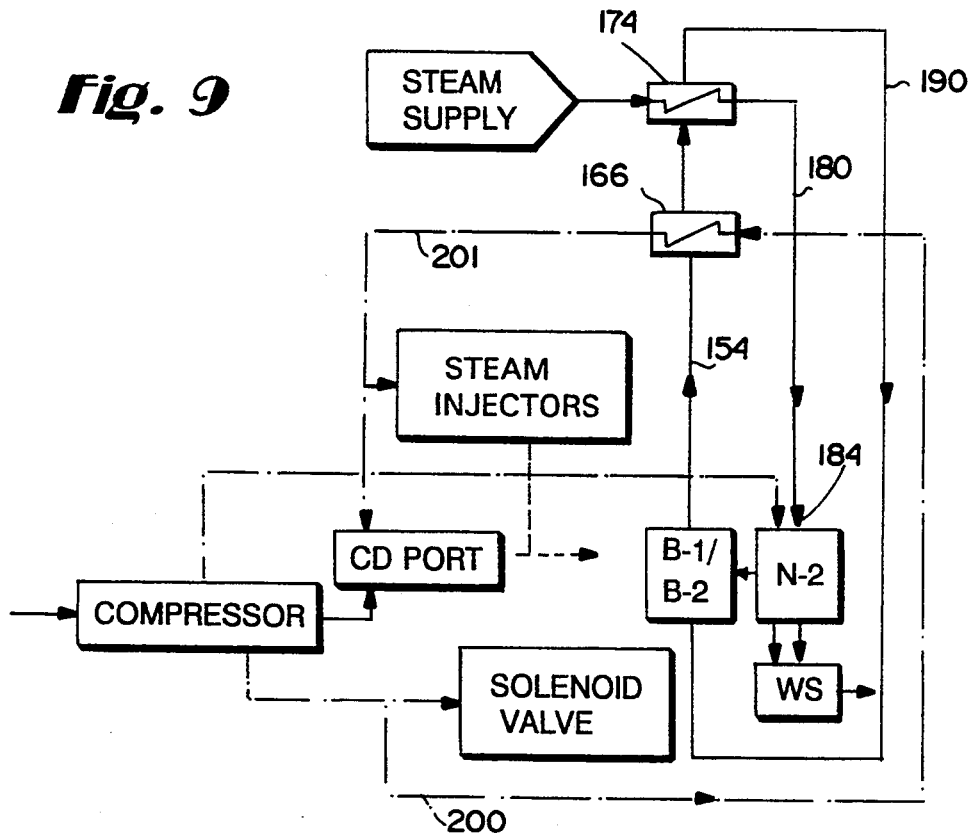

To transition from air cooling to steam cooling, and with reference to FIGS. 1 and 8, the steam is preheated in the supply lines to at least 50° F. (10° C.) of superheat. A warm-up drain connection with a high pressure thermostatic steam trap is provided to warm up the steam supply lines. Particularly, the steam supply is allowed to flow through metering device 176, a check valve 206 and warm-up drain valves 208, to a thermostatic trap 210. Shut-off valves 192 are closed. During any gas turbine shutdown, warm-up drain valves 208 are also maintained opened, with shut-off valve 192 closed.

As will be recalled, the turbine blades are cooled in the start-up mode with extraction flows from the high pressure compressor source with the solenoid valve S open. Nozzle cooling air flows through control valve 44 into the nozzle vanes and escapes into the gas flow. When the temperature and pressure of the steam flow meter 176 is at a predetermined level, steam is supplied to the steam turbine. Particularly, valves 208 are closed and valves 192 are open. Solenoid valve S closes to shut off the air flow via valve or gap 122 to the turbine blades. Consequently, steam flows during normal operation from the steam supply S in inner and outer circuits as previously described.

Accordingly, means are provided cooperable with the cooling air supply means and the steam supply means for effecting a transition between air and steam cooling the turbine. Such means may include any number of various valves as those skilled in the art will recognize. In a preferred embodiment, such means may include valves 44, 122, 207 and 192.

Particularly, in normal steam operation, steam flows from steam supply ST via conduit 180 (FIGS. 1 and 9) into manifold 40 in an inner circuit for combining with steam supplied via conduit 190 and channel 60 in the wheel chambers 52 and 54. The combined steam flows from the turbine blades via conduits 154 to heat exchanger 166. Simultaneously, high pressure extraction air is diverted via conduit 00 and solenoid S is deactivated to close air gap 122. This diverted air flows in heat exchange relation with the steam from the turbine blades to heat the air and cool the steam whereby the heat exchanger 166 serves as a regenerator. The diverted air then flows to either the combustor steam injection or to the compressor discharge port depending upon combustion emission requirements. The steam flowing through heat exchanger 166 can then be directed to combustor steam injection 170 or compressor discharge port 172, both via conduit 201. Alternatively, steam can flow in a closed loop to meter 176 via a regulator 207, a three-way valve 209, heat exchanger 174 and check valve 211 to complete the steam outer circuit. Further, during normal operation, steam flows from steam supply ST to chambers 66 via conduit 180 with three-way valve 44 open for cooling flow within the nozzle blades and flow into the gas flow through the turbine.

Figure 10:
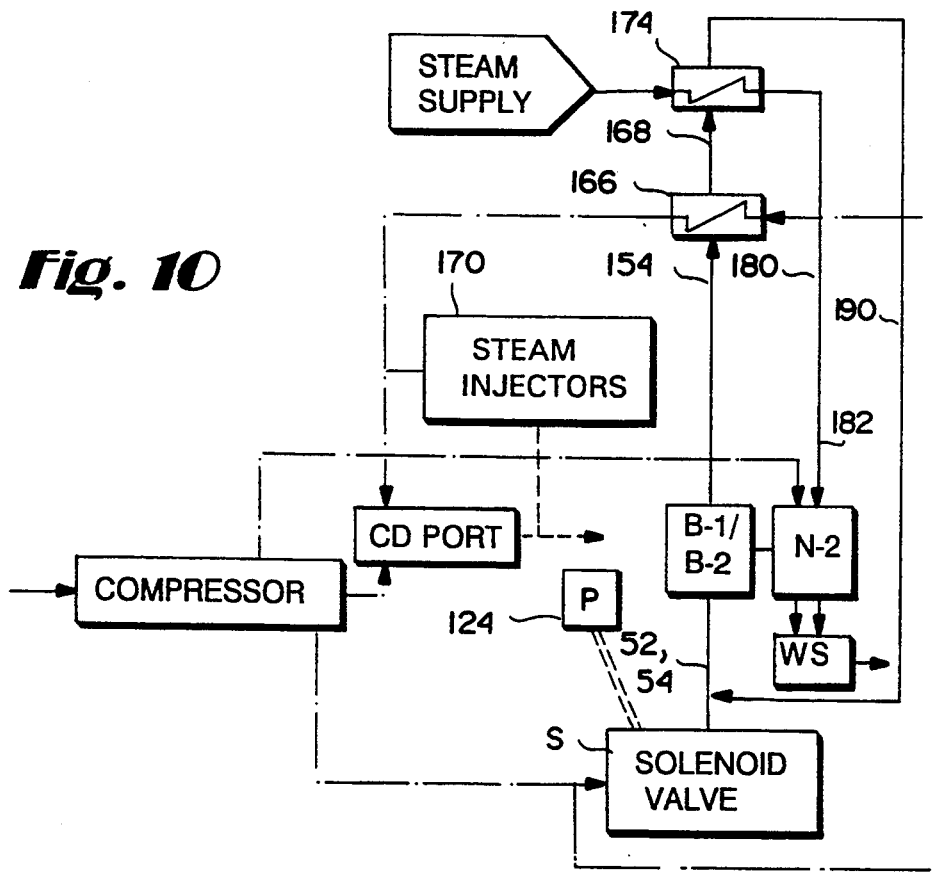

In the event that malfunctions occur in the turbine or in the cooling circuit, resulting in gas temperature increases beyond predetermined limits or reduced cooling flow, pyrometers 124 sense the increased temperature of the first and second turbine blades. Through suitable coupling, the pyrometers control the opening of solenoid S. Consequently, when high temperatures obtain in the turbine blading, the solenoid valve opens and extraction air from the compressor passes into the wheel space cavities and chambers 52 and 54 is mixed with the steam flow for cooling the turbine blades. This system is illustrated in FIG. 10.

Figure 11:
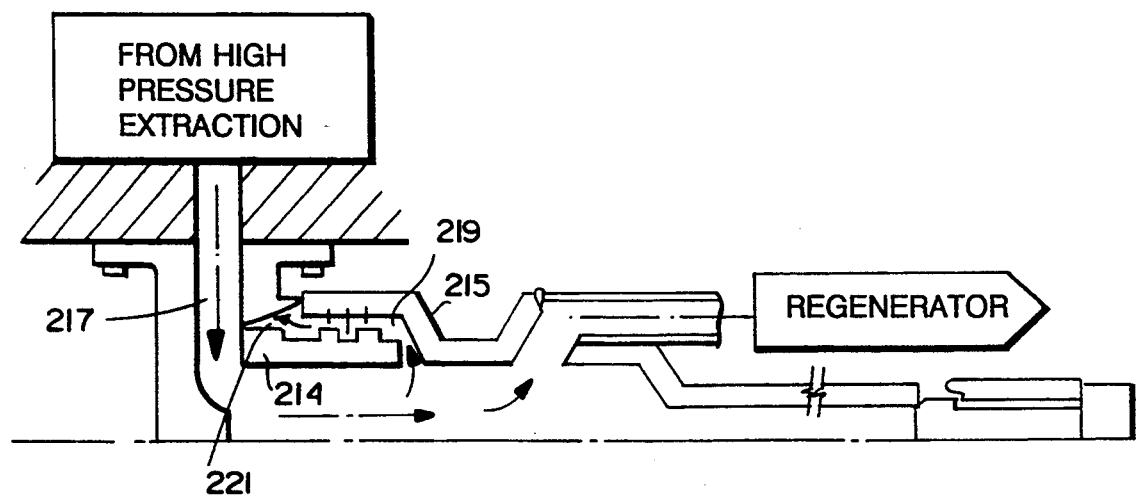
FIG. 11 is a fragmentary longitudinal cross-sectional view illustrating an air circuit bypass for the wheel space cavities.

In existing turbine designs, compression air is used exclusively for cooling the hot gas path parts. In the case of turbine blade cooling, air from a high pressure extraction source is forced to flow radially inward toward wheel space cavities 213 before proceeding to the turbine blades. It is believed that the amount of jet flow in these cavities affects the temperature gradients in the turbine wheels. As a result of this condition, the turbine material is thermally fatigued. Ultimately, this may affect the rotor low cycle fatigue (LCF) life. To eliminate this problem, the air jets are prevented from reaching the turbine wheels. Thus, at the compressor wheel and distance piece interface, a bypass is provided to divert the air flow from the wheel space cavities. This is illustrated in FIG. 11. Also in this figure is illustrated the connection between the rotating nozzle collar 214 and the stationary bypass piping 215. Air from the high pressure source via conduit 217 flows through a 90° bend. Some air leaks into cavity 219 of the stationary collar, passes through a sealing arrangement, and expands through orifice 221. This creates a recirculation zone around the rotating nozzle collar 214, thus providing an effective seal for the transition from rotating to stationary collar components. During steam cooling under normal operation, the solenoid valve S is closed. The extraction air flows to the regenerator 166 to pick up heat from the steam before returning to the gas turbine cycle. This completes the air closed circuit with the benefit of ameliorating the turbine rotor LCF problem due to high pressure air cooling extraction.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An integrated steam and air cooling system for a gas turbine comprising:

a pair of axially spaced, rotatable turbine stages, each having a plurality of turbine blades for disposition in a gas flow through said turbine;

a nozzle stage between said turbine stages and including a plurality of nozzle vanes for disposition in the gas flow through said turbine;

means for supplying cooling air to and for passage through said blades and vanes to air cool said turbine;

means for supplying steam to and for passage through said blades and vanes to steam cool said turbine;

means cooperable with said cooling air supply means and said steam supply means for effecting a transition between air cooling said turbine and steam cooling said turbine;

a turbine shaft, said blades and said vanes having interior passages, a spacer between said turbine stages and rotatable therewith, wheels about said shaft mounting said turbine blades and spaced axially from and on opposite sides of said spacer to define chambers on axially opposite sides of said spacer, said steam supplying means including first and second steam supply circuits, said first circuit including a steam supply, a channel adjacent said shaft and in communication with said steam supply for suppling steam to said chamber and said interior passages of said turbine blades, said second steam supply circuit including said steam supply, a manifold about said nozzle vanes for supplying steam from said steam supply to said interior passages of said nozzle vanes, means in communication between said interior passages of said nozzle vanes and said chambers for combining steam from said first circuit in said chambers with steam of said second circuit in said chambers, whereby the combined steam of said first and second circuits flows through the interior passages of said turbine blades.

2. An integrated steam and air cooling system for a gas turbine comprising:

a pair of axially spaced, rotatable turbine stages, each having a plurality of turbine blades for disposition in a gas flow through said turbine;

a nozzle stage between said turbine stages and including a plurality of nozzle vanes for disposition in the gas flow through said turbine;

means for supplying cooling air to and for passage through said blades and vanes to air cool said turbine;

means for supplying steam to and for passage through said blades and vanes to steam cool said turbine;

means cooperable with said cooling air supply means and said steam supply means for effecting a transition between air cooling said turbine and steam cooling said turbine;

a turbine shaft, a spacer between said turbine stages and rotatable therewith, wheels about said shaft mounting said turbine blades and spaced axially from and on opposite sides of said spacer to define chambers on axially opposite sides of said spacer, certain of said vanes having interior passages and certain of said blades having interior passages, said steam supplying means including a manifold about radially outermost portions of said nozzle vanes in communication with said nozzle vane interior passages for supplying steam thereto during steam cooling of said turbine, a channel adjacent said shaft for supplying steam to said chambers, said chambers lying in communication with said turbine blade passages whereby cooling steam is supplied from said channel and said nozzle vanes to said chambers for flow to said turbine blades.

3. An integrated steam and air cooling system for a gas turbine comprising:

a pair of axially spaced, rotatable turbine stages, each having a plurality of turbine blades for disposition in a gas flow through said turbine;

a nozzle stage between said turbine stages and including a plurality of nozzle vanes for disposition in the gas flow through said turbine;

means for supplying cooling air to and for passage through said blades and vanes to air cool said turbine;

means for supplying steam to and for passage through said blades and vanes to steam cool said turbine;

means cooperable with said cooling air supply means and said steam supply means for effecting a transition between air cooling said turbine and steam cooling said turbine; and a turbine shaft, a spacer between said turbine stages and rotatable therewith, wheels about said shaft mounting said turbine blades and spaced axially from and on opposite sides of said spacer to define chambers on axially opposite sides of said spacer, said cooling air supply means including a cooling air inlet adjacent said shaft for supplying cooling air to said chambers, a valve movable between open and closed positions to selectively control the flow of air from said cooling air supply means through said air inlet, a heat exchanger, certain of said blades having interior passages for conveying steam therethrough, means operable during steam cooling of said turbine for conveying steam from said passages of said turbine blades to said heat exchanger, said cooling air supply means including an air bypass circuit for directing air from said cooling air supply means, when said valve is in said closed position, to said heat exchanger in heat exchange relation with the steam conveyed thereto for heating the air, and means for conveying the heated air into the gas flow of the turbine.

4. An integrated steam and air cooling system for a gas turbine comprising:

a pair of axially spaced, rotatable turbine stages, each having a plurality of turbine blades for disposition in a gas flow through said turbine;

a nozzle stage between said turbine stages and including a plurality of nozzle vanes for disposition in the gas flow through said turbine;

means for supplying cooling air to and for passage through said blades and vanes to air cool said turbine;

means for supplying steam to and for passage through said blades and vanes to steam cool said turbine;

said steam supplying means including passages within the turbine for communicating steam passing through one of said blades and vanes to another of said blades and said vanes; and means cooperable with said cooling air supply means and said steam supply means for effecting a transition between air cooling said turbine and steam cooling said turbine.

5. A cooling system according to claim 4 wherein certain of said nozzle stage vanes have two interior passages, said cooling air supply means supplying cooling air to one of said two interior passages during steam cooling of said turbine, said steam supply means supplying steam to the other of said two interior passages during steam cooling of said turbine whereby combined steam and air cooling of said turbine is effected.

6. A cooling system according to claim 4 including a turbine shaft, a spacer between said turbine stages and rotatable therewith, wheels about said shaft mounting said turbine blades and spaced axially from and on opposite sides of said spacer to define chambers on axially opposite sides of said spacer, said cooling air supply means including a cooling air inlet adjacent said shaft for supplying cooling air to said chambers, a valve movable between open and closed positions to selectively control the flow of air from said cooling air supply means through said air inlet, a heat exchanger, certain of said blades having interior passages for conveying steam therethrough, means operable during steam cooling of said turbine for conveying steam from said passages of said turbine blades to said heat exchanger, said cooling air supply means including an air bypass circuit for directing air from said cooling air supply means, when said valve is in said closed position, to said heat exchanger in heat exchange relation with the steam conveyed thereto for heating the air, and means for conveying the heated air into the gas flow of the turbine.

7. A cooling system according to claim 6 wherein said turbine includes a combustor having a steam injector and a compressor having a discharge port, said heated air conveying means being adapted to convey the heated air to one of said steam injector and said compressor discharge port.

8. A cooling system according to claim 4 including a turbine shaft, a spacer between said turbine stages and rotatable therewith, wheels about said shaft mounting said turbine blades and spaced axially from and on opposite sides of said spacer to define chambers on axially opposite sides of said spacer, certain of said vanes having interior passages and certain of said blades having interior passages, said steam supplying means including a manifold about radially outermost portions of said nozzle vanes in communication with said nozzle vane interior passages for supplying steam thereto during steam cooling of said turbine, a channel adjacent said shaft for supplying steam to said chambers, said chambers lying in communication with said turbine blade passages whereby cooling steam is supplied from said channel and said nozzle vanes to said chambers for flow to said turbine blades.

9. A cooling system according to claim 4 including a turbine shaft, certain of said blades having interior passages, said cooling air supply means including a cooling air inlet adjacent said shaft for supplying cooling air to said interior passages of said turbine blades, a valve for selectively controlling the flow of air through said air inlet, a sensor for sensing the temperature of the turbine blades and means responsive to said sensor sensing a predetermined temperature of said blades for opening said valve to admit cooling air through said cooling air inlet.

10. A cooling system according to claim 4 including a turbine shaft, said blades and said vanes having interior passages, a spacer between said turbine stages and rotatable therewith, wheels about said shaft mounting said turbine blades and spaced axially from and on opposite sides of said spacer to define chambers on axially opposite sides of said spacer, said steam supplying means including first and second steam supply circuits, said first circuit including a steam supply, a channel adjacent said shaft and in communication with said steam supply for suppling steam to said chamber and said interior passages of said turbine blades, said second steam supply circuit including said steam supply, a manifold about said nozzle vanes for supplying steam from said steam supply to said interior passages of said nozzle vanes, means in communication between said interior passages of said nozzle vanes and said chambers for combining steam from said first circuit in said chambers with steam of said second circuit in said chambers, whereby the combined steam of said first and second circuits flows through the interior passages of said turbine blades.

11. In a gas turbine having a pair of axially spaced, rotatable turbine stages, each having a plurality of turbine blades for disposition in a gas flow through said turbine with at least certain of said turbine blades each having at least one interior passage, a nozzle stage between said turbine stages and including a plurality of nozzle vanes for disposition in the gas flow through said turbine with at least certain of said vanes each having at least one interior passage, a method of operating a cooling system for the gas turbine including the steps of:

providing passages within the turbine for communicating steam passing through one of said blades and vanes to another of said blades and said vanes for passage through the interior passage of said another of said blades and said vanes;

initially supplying cooling air to said interior passages of said turbine blades to air cool said turbine during start-up of said turbine;

thereafter supplying steam to said interior passages of said turbine blades to steam cool said turbine during normal operation of said turbine after turbine start-up; and effecting a transition between air cooling said turbine and steam cooling said turbine.

12. A method according to claim 11 including, during normal operation of said turbine, cooling said turbine solely by steam cooling.

13. A method according to claim 11 wherein said turbine stages includes a pair of turbine wheels and a spacer between said wheels defining chambers between the spacer and the turbine wheels, said step of supplying steam including the step of providing steam to said chambers to minimize or eliminate thermal gradients across the wheels and spacer.

14. A method according to claim 11 including providing steam supply lines for supplying steam to said turbine blades and preheating said steam supply lines.

15. A method according to claim 11 including, during normal operation of said turbine, cooling said turbine solely by steam cooling, sensing the temperature of the turbine blades at at least one of said stages, and supplying cooling air for combining with the cooling steam for cooling the turbine in response to sensing a predetermined temperature of said turbine blades.

16. In a gas turbine having a pair of axially spaced, rotatable turbine stages, each having a plurality of turbine blades for disposition in a gas flow through said turbine with at least certain of said turbine blades each having at least one interior passage, a nozzle stage between said turbine stages and including a plurality of nozzles vanes for disposition in the gas flow through said turbine with at least certain of said vanes each having at least one interior passage, a method of operating a cooling system for the gas turbine including the steps of:

initially supplying cooling air to said interior passages of said turbine blades to air cool said turbine during normal start-up of said turbine;

thereafter supplying steam to said interior passages of said turbine blades to steam cool said turbine during normal operation of said turbine after turbine start-up;

effecting a transition between air cooling said turbine and steam cooling said turbine; and exhausting the steam used to cool said turbine during normal operation through a heat exchanger, said turbine having a compressor, supplying cooling air from said compressor to said heat exchanger in heat exchange relation with the exhaust steam from the turbine blades to heat the air, and directing the air from the heat exchanger into the turbine gas flow.

17. In a gas turbine having a pair of axially spaced, rotatable turbine stages, each having a plurality of turbine blades for disposition in a gas flow through said turbine with at least certain of said turbine blades each having at least one interior passage, a nozzle stage between said turbine stages and including a plurality of nozzle vanes for disposition in the gas flow through said turbine with at least certain of said vanes each having at least one interior passage, a method of operating a cooling system for the gas turbine including the steps of:

initially supplying cooling air to said interior passages of said turbine blades to air cool said turbine during start-up of said turbine;

thereafter supplying steam to said interior passages of said turbine blades to steam cool said turbine during normal operation of said turbine after turbine start-up;

effecting a transition between air cooling said turbine and steam cooling said turbine;

during normal operation of said turbine, cooling said turbine solely by steam cooling, sensing the temperature of the turbine blades at at least one of said stages, and supplying cooling air for combining with the cooling steam for cooling the turbine in response to sensing a predetermined temperature of said turbine blades; and wherein the step of supplying cooling air includes supplying cooling air from a turbine compressor discharge port for flowing radially outwardly past a solenoid actuated valve, the step of supplying cooling steam including flowing the steam into chambers defined between turbine wheels of said stages, and actuating said solenoid to open said valve in response to sensing said predetermined temperature to supply said cooling air through said open valve for combining with the cooling steam in said chambers.

18. In a gas turbine having a pair of axially spaced, rotatable turbine stages, each having a plurality of turbine blades for disposition in a gas flow through said turbine with at least certain of said turbine blades each having at least one interior passage, a nozzle stage between said turbine stages and including a plurality of nozzle vanes for disposition in the gas flow through said turbine with at least certain of said vanes each having at least one interior passage, a method of operating a cooling system for the gas turbine including the steps of:

initially supplying cooling air to said interior passages of said turbine blades to air cool said turbine during start-up of said turbine; and thereafter supplying steam to said interior passages of said turbine blades to steam cool said turbine during normal operation of said turbine after turbine start-up;

effecting a transition between air cooling said turbine and steam cooling said turbine; and wherein the step of supplying cooling steam includes directing steam generally radially inwardly through the nozzle stage from a steam supply line radially outwardly of said nozzle stage, directing steam generally radially outwardly through said turbine blades from a steam supply line radially inwardly of said turbine blades and adjacent a shaft for said turbine, and combining at least part of the steam flowing radially inwardly through the nozzle stage with the steam flowing radially outwardly from adjacent said shaft for combined flows through said turbine blades.

19. A method according to claim 18 wherein the step of supplying cooling air includes supplying cooling air from a turbine compressor discharge port for flow radially outwardly past a solenoid actuated valve, and actuating said valve to supply cooling air for combination with said at least part of the cooling steam for combined steam and air flow through said turbine blades.

* * * * *